Patented Apr. 21, 1936

2,038,494

UNITED STATES PATENT OFFICE 2,038,494

METHOD OF PRODUCING LAMINATED GLASS

Adolf Kämpfer, Berlin, Germany

No Drawing. Application March 18, 1935, Serial No. 11,735. In Germany March 14, 1934

3 Claims. (Cl. 49—81)

The invention relates to laminated glass, and more particularly to a laminated glass of that kind in which there is employed a relatively thick non-splintering intermediate layer.

It has been found that a non-splintering intermediate layer requires to possess a considerable elongation elasticity and power of adhesion in order to comply with the requirements now placed on a glass of this description. Extensive and permanent adhesion is necessary to maintain pieces or fragments of all sizes, which result when the glass is fractured, in secure connection with the intermediate layer, and the considerable elastic elongation of the intermediate layer is required to permit of flexing of the single sheets so as to avoid complete fracture when subjected to strain.

In order to obtain these properties of adhesion and elongation elasticity to the requisite high degree, it is now usual to employ for the non-splintering intermediate layers artificial resins, which are not finally polymerized, but the polymerization of which is interrupted at a suitable intermediate stage, and the elongation elasticity and plasticity of which are obtained by the addition of softening agents, such as butylstearate, triphenylphosphate, triphenylphosphate mixed with dimethylphthalate, diethylphthalate, dibutylphthalate, phthalic acid ester of high boiling point, triacetine, tributylphosphate or tricresylphosphate, these softening means being at the same time so selected that they obstruct additional polymerization in daylight or direct sunlight and impart to the intermediate layer a softness as permanent as possible.

Relatively thick, adhesive and elastic intermediate layers of this kind ensure valuable properties in respect of the finished product, but at the same time they present considerable difficulties not only in their production but also when fitting laminated glass made with the assistance thereof. If the intermediate layers are made sufficiently soft with an adequate elongation elasticity, so that they will not solidify at the cooler temperatures prevailing even in temperate zones, they will, at higher temperatures which occur both in temperate as well as in hotter zones, readily become liquid to such an extent that they exude from between the single sheets. In consequence it has not been possible heretofore to use intermediate layers having a degree of softness such as desirable more particularly for absorbing vibrations in the single sheets of glass or also in respect of multiple-layer bullet proof glass, and it has been necessary to employ a degree of viscosity permitting of proper manufacture and preventing escape from between the sheets even in the case of higher temperatures.

It might very well be assumed that the disadvantages above referred to in association with a sufficiently soft intermediate layer are to be avoided by the use of a comparatively rigid marginal strip between each two adjacent sheets of glass, this strip being capable of preventing a flowing or pressing out or also any displacement of the intermediate layer between the sheets confining the same. The proposals hitherto made in this connection have not produced the desired result owing to the fact that in connection with a comparatively rigid marginal strip fundamentally the same properties are called for as in the case of the elastic and adhesive intermediate layer.

At the same time the marginal strip also requires to present sufficient resistance to deformation. Moreover it may not consist of a material which is adapted to act chemically on the intermediate layers composed of polymerization products, as otherwise the glass would soon become cloudy and discolored, and bubbles would also be formed later.

According to the invention, the problem in question is solved in extremely simple fashion, use being made of the recognition that the polymerization of artificial resins may be performed in a comparatively short time practically up to the final stage by employing means which greatly assist the polymerization, assuming that these means are used in the most concentrated form. Merely those means are employed, which are adapted to act solely on the free marginal face, as any assisted additional polymerization of the intermediate layers would be detrimental and prejudicial to the valuable properties imparted to the layers. It has been found, however, that a hardening of the free end faces of the intermediate layer may be accomplished in a comparatively short time, for example in 48 hours, down to a depth of between 3 and 4 mm. by the use of pure oxygen. It has been found to be of advantage to perform this treatment of the free end faces of the intermediate layer at temperatures up to 50° C. An advantage resides in the fact that the hardening becomes less as the depth increases. In this manner the formation of hard bearing edges between the sheets is avoided, and the change over to the soft intermediate layer between the sheets is gradual outside of the marginal zone.

Preferably the procedure is such that a series of laminated glasses after production are stacked one upon the other, and the free end faces of the intermediate layers then subjected for the necessary length of time to the action of pure oxygen, for example within a closed container which is capable of being heated. The oxygen is able to exert a polymerizing effect only to a depth of 3 or at the most 4 mm., so that this treatment does not affect the actual intermediate layer or prove harmful to the valuable properties thereof.

The rigid marginal strip thus obtained about the soft intermediate layer prevents any adverse deformation of the latter in the case of high outer temperature, and permits of the use of considerably softer intermediate masses than has hitherto been possible, so that the valuable properties of laminated glass of this kind are very greatly enhanced. The finished glass is thus made capable of transport, and any method of fitting the glass, for example by means of pressed-in sealing strips, is rendered possible without the least danger of damage to the structure. By reason of the marginal strip produced according to the invention the intermediate layer is completely protected against any detrimental external effect, and the marginal strip may be ground and polished in the manner of ordinary glass.

What I claim as new and desire to secure by Letters Patent is:

1. A method of producing laminated glass, which consists in joining sheets of glass by a comparatively thick intermediate layer of a partially polymerized artificial resin, and then subjecting the exposed portion of the said intermediate layer to the action of a polymerization-assisting agent in maximum concentration for such time until the artificial resin bordering the edges of the glass sheets has been hardened to a predetermined depth.

2. A method of producing laminated glass, which consists in joining sheets of glass by a comparatively thick intermediate layer of a partially polymerized artificial resin and then subjecting the exposed portion of the said intermediate layer to the action of pure oxygen for the purpose of hardening the artificial resin bordering the edges of the glass sheets to a desired depth.

3. A laminated glass structure, comprising two sheets of glass, a layer of partially polymerized artificial resin interposed between the sheets of glass, and a marginal strip of said resin between the sheets of glass adjacent the edges of the same which is polymerized to a higher degree than that lying within the marginal strip.

ADOLF KÄMPFER.